United States Patent [19]
Hackenberg et al.

[11] 3,768,388
[45] Oct. 30, 1973

[54] PHOTOGRAPHIC APPARATUS WITH DEFORMABLE RELEASE MEANS

[75] Inventors: Hubert Hackenberg; Johann Putscher; Rainer Spinnler, all of Munchen, Germany

[73] Assignee: Agfa Gevaert Aktiengesellschaft, Leverkusen, Germany

[22] Filed: Aug. 26, 1971

[21] Appl. No.: 175,096

[30] Foreign Application Priority Data
Sept. 10, 1970 Germany.................. P 20 44 740.9

[52] U.S. Cl. .............................. 95/31 R, 95/31 FL
[51] Int. Cl. .......................................... G03b 19/12
[58] Field of Search ................ 95/11 R, 31 R, 53 E, 95/31 FL

[56] References Cited
UNITED STATES PATENTS
3,603,228   9/1971   Kremp .............................. 95/11 R FOREIGN PATENTS OR APPLICATIONS
1,104,234   2/1968   Great Britain ..................... 95/31 R
1,805,165   5/1970   Germany............................. 95/31 R
1,597,046   1/1970   Germany............................. 95/53 E Primary Examiner—Samuel S. Matthews
Assistant Examiner—Russell E. Adams, Jr.
Attorney—Michael S. Striker

[57] ABSTRACT

A still camera wherein the film transporting mechanism has a rapid transport lever and the release mechanism has a deformable membrane mounted in a recess at the outer side of the lever. The deformation of the membrane results in actuation of the shutter in a single angular position of the lever. The membrane transmits motion to a shutter actuating member of the release mechanism by way of two plate-like members which rotate in response to pivoting of the lever.

17 Claims, 2 Drawing Figures

INVENTORS
HUBERT HACKENBERG
JOHANN PUTSCHER
REINER SPINNLER

BY: Michael S. Striker
ATTORNEY

PHOTOGRAPHIC APPARATUS WITH DEFORMABLE RELEASE MEANS

CROSS-REFERENCE TO RELATED APPLICATION

The photographic apparatus of the present invention constitutes an improvement over and a further development of photographic apparatus disclosed in the copending application Ser. No. 749,170, filed July 31, 1968 by Alfred Winkler et al. and owned by the same assignee.

BACKGROUND OF THE INVENTION

The present invention relates to photographic apparatus in general, and more particularly to improvements in release means for photographic apparatus. Still more particularly, the invention relates to improvements in release means of the type wherein the making of an exposure is initiated in response to deformation of a membrane.

The aforementioned copending application Ser. No. 749,170 of Winkler et al. discloses a photographic apparatus wherein the housing supports a fixedly mounted membrane. A minute deformation of such membrane suffices to effect an actuation of the shutter for the purpose of making an exposure in response to closing of one or more switches, in response to energization of an electromagnet, and/or by way of a linkage or the like.

SUMMARY OF THE INVENTION

An object of the invention is to provide a photographic apparatus wherein the deformable membrane of the camera release is mounted in a novel and improved way.

Another object of the invention is to provide a photographic apparatus with a compact and relatively simple release mechanism having a whose deformation results in the making of an exposure only upon completed transport of the film to such an extent that the incoming scene light impinges upon an unexposed film frame.

A further object of the invention is to provide a photographic apparatus with a novel and improved release mechanism wherein the membrane is adequately protected and shielded against damage and/or against the making of accidental exposures.

An additional object of the invention is to provide a novel and improved operative connection between the deformable membrane and that component of a release mechanism for photographic apparatus which actuates the shutter in response to deformation of the membrane.

A feature of the invention resides in the provision of a photographic apparatus, particularly a still camera for use with roll film having a row of equidistant perforations, one for each film frame, which comprises a housing or body, film transporting means including an input element (preferably a rapid transport lever) which is supported by the housing for angular movement about a predetermined axis, and release means including a deformable membrane which is mounted on the input element so as to be accessible from without the housing. The membrane is preferably of circular outline and its center is preferably located on the axis of the input element. The outer side of the input element is preferably provided with a recess which receives the membrane and which may further receive an annular frame surrounding the membrane and extending beyond the outer side of the input element and/or beyond the outer side of the membrane.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
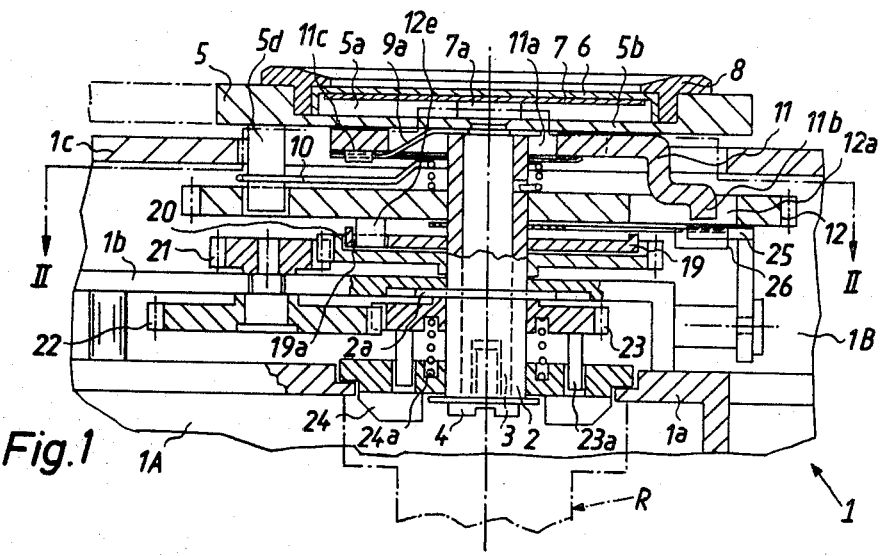
FIG. 1 is an enlarged longitudinal vertical sectional view of a still camera which embodies the invention.

The drawing illustrates a portion of a still camera having a housing 1 which includes a lower or main portion 1A and an upper portion or top 1B. The main portion 1A has a horizontal top wall 1a and the upper portion 1B comprises a top wall 1c and an intermediate wall 1b. The wall 1b is fixed to the wall 1a. A vertical bearing sleeve 2 is installed in the housing 1 so as to extend through registering openings in the walls 1a-1b and 1c. This sleeve 2 has a flange 2a which is affixed to the underside of the intermediate wall 1b. A shaft 3 is inserted into the sleeve 2 from above and its lower end portion meshes with a retaining screw 4 which holds it against axial movement relative to the bearing sleeve 2. The shaft 3 defines a vertical pivot axis for a rapid transport lever 5 which constitutes the input element of a film transporting mechanism. In order to transport the film by the length of a frame, the user of the still camera must pivot the lever 5 in a counterclockwise direction, as viewed in FIG. 2, to thereby stress a return spring here shown as a torsion spring 10 (FIG. 1, between the walls 1b, 1c) which tends to maintain the lever 5 in the illustrated starting angular position. The spring 10 is strong enough to automatically return the lever 5 to the illustrated angular position when the lever is released by the user's hand.

That portion of the lever 5 which surrounds the shaft 3 is provided at its outer side with a recess 5a which is concentric with the bearing sleeve 2 and shaft 3 and serves to receive a deformable release member in the form of a flexible membrane 6 having a circular outline. This membrane has its center on the axis of the shaft 3 and constitutes one component of a composite release mechanism which can actuate the shutter in response to relatively small deformation of the membrane in order to make an exposure. The membrane 6 overlies a plate-like first motion transmitting member 7 which is received in the recess 5a of the lever 5 and is moved downwardly with reference to the housing 1 when the membrane is deformed in response to the application of finger pressure in the axial direction of the shaft 3. The member 7 constitutes a second component of the release mechanism and may consist of a metallic or synthetic plastic material. Still further, the recess 5a of the input element or lever 5 receives a ring-shaped frame 8 which extends at least slightly beyond the outer side of the membrane 6 and/or beyond the outer side of the lever 5 so as to protect the membrane against damage as well as to enable the user to rapidly locate the membrane even when not looking at the lever 5. The frame 8 further insures that a user is less likely to make an accidental exposrue.

Figure 2:
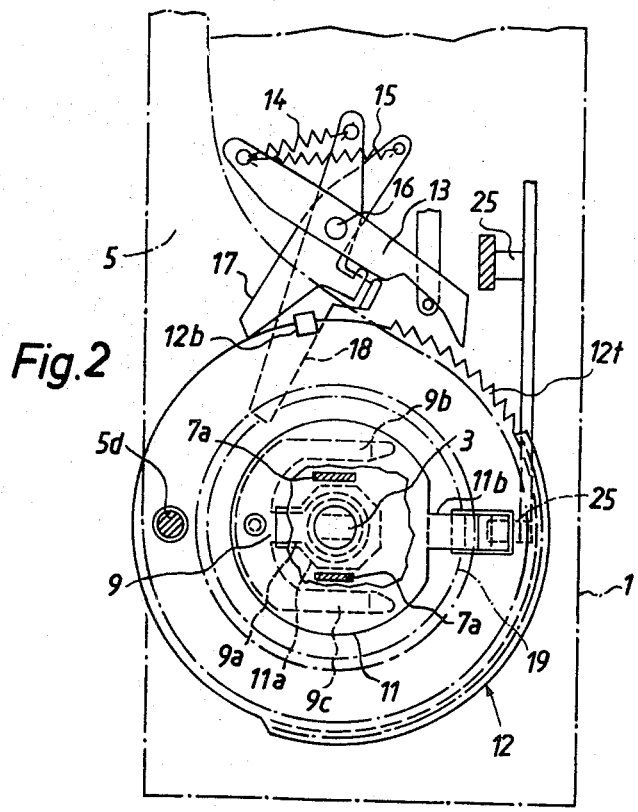
FIG. 2 is a horizontal sectional view as seen in the direction of arrows from the line II—II of FIG. 1, the outline of the housing being indicated by phantom lines.

The motion transmitting member 7 is provided with at least one pair of downwardly or inwardly extending projections 7a which are disposed diametrically opposite each other with reference to the axis of the shaft 3 (see FIG. 2). The projections 7a extend through registering openings in the lever 5 inwardly of the recess 5a, namely, in a bottom wall 5b of the lever 5, and through openings in the top wall 1c of the housing portion 1B.

The upper end portion of the shaft 3 carries a substantially E-shaped leaf spring 9 which has a median arm 9a and two outer arms 9b, 9c (see particularly FIG. 2). The median arm 9a is bent upwardly toward the bottom wall 5b of the lever 5 and surrounds a reduced neck portion of the shaft 3. The arms 9a-9c of the spring 9 guide and support a tiltable plate-like second motion transmitting member 11 of the release mechanism. The member 11 has a centrally located opening 11a which is concentric with and surrounds with clearance the bearing sleeve 2 (see FIG. 1), and a downwardly extending projection or finger 11b which is shown as being located in the three o'clock position, as viewed in FIG. 2. The median arm 9a of the leaf spring 9 extends upwardly through the central opening 11a of the member 11. The projection or finger 11b of the member 11 extends into an opening or slot 12a which is provided in a wheel 12 having an annulus of ratchet teeth 12t. The wheel 12 is rotatable on the sleeve 2 and is furtehr provided with an axially parallel bore for a driving pin 5d of the lever 5. The pin 5d compels the wheel 12 to share the angular movements of the lever 5 about the axis of the shaft 3. The parts 5d and 12 constitute a drive which rotates the second motion transmitting member 11 in response to pivoting of the lever 5.

The teeth 12t of the wheel 12 cooperate with a blocking pawl 13 which engages the adjacent teeth 12t in response to penetration of a tracking member (not shown) into an oncoming perforation of roll film (not shown) in the housing 1. The film is assumed to be of the type having a row of perforations, one for each film frame. When the tracking member detects and penetrates into an oncoming perforation of the film while the lever 5 is being pivoted in a counterclockwise direction, as viewed in FIG. 2, the blocking pawl 13 engages the adjacent teeth 12t and thus prevents further anticlockwise pivotal movement of the lever 5 and further anticlockwise rotation of the parts 11, 12 at the exact moment when the film has been advanced by the length of a frame. The blocking pawl 13 is pivotable on a pin 16 which further serves a fulcrum for two additional pawls 17 and 18. The pallet of the pawl 17 is disengaged from the wheel 12 when the latter is engaged by the pawl 13 because the pawls 13, 17 are coupled to each other by a helical spring 15. A further helical spring 14 couples the pawl 13 with the pawl 18. The latter pawl can engage a second wheel 19 which is rotatable relative to the wheel 12 to the extent determined by the length of an arcuate slot 19a. The slot 19a receives a post 12e of the wheel 12. The pallet of the pawl 17 rides over the teeth 12t when the wheel 12 rotates the lever a counterclockwise direction in response to anticlockwise pivoting of thelever 5 but the pawl 17 prevents rotation of the wheel 12 in the clockwise direction before the teeth 12t are engaged by the pallet of the pawl 13. The pallet of the pawl 18 rides over the teeth of the wheel 19 when the lever 5 is being pivoted in a counterclockwise direction, but such pallet prevents rotation of the wheel 19 in the clockwise direction before the pallet of the pawl 13 engages the teeth 12t. Thus, the wheels 12, 19 are free to rotate in a clockwise direction only when their teeth are not engaged by the pallets of the pawls 17 and 18.

The wheel 12 is further provided with a lobe 12b over which the pallet of the pawl 17 rides when the wheel 12 is rotated by the lever 5 in a counterclockwise direction. However, if the spring 10 tends to pivot the lever 5 (and to thus rotate the wheel 12) in a clockwise direction before the blocking pawl 13 has been caused to engage the teeth 12t, the pallet of the pawl 17 extends into the path of movement of the lobe 12b and prevents the lever 5 from returning all the way to its starting angular position which is shown in FIG. 2. The lobe 12b constitutes a safety feature which indicates to the user that the film was not advanced by the full length of a frame; such safety feature is desirable for the event that the user accidentally releases the lever 5 prior to completed transport of the film by the full length of a frame. However, if the transport of film by the full length of a frame is completed, the pawl 13 is caused to engage the teeth 12t and disengages the pawls 17, 18 from the wheels 12 and 19. The spring 10 is then free to return the lever 5 all the way to its starting angualr position. The pawl 13 is disengaged from the wheel 12 in response to deformation of the membrane 6 (i.e., in response to completion of an exposure) to thereby free the lever 5 for renewed pivotal movement in a counterclockwise direction against the opposition of the return spring 10. It will be noted that the pawl 13 serves as a means for blocking the film transporting mechanism upon completed transport of the film by the length of a frame and prior to the making of the next-following exposure.

The length of the slot 19a in the wheel 19 is such that, when the lever 5 is released prematurely (prior to completed transport of the film by the length of a frame), the lobe 12b of the wheel 12 can move into engagement with the pallet of the pawl 17 while the wheel 12 rotates with reference to the wheel 19. This is fully described in German Utility Model No. 7,011,290 to which reference may be had if necessary. During such rotary movement of the wheel 12 with reference to the wheel 19, the latter wheel is held against rotation with the wheel 12 by the pallet of the pawl 18. It will be noted that the teeth 12t need not extend all the way around the periphery of the wheel 12. The pallet of the pawl 18 is automatically disengaged from the teeth of the wheel 19 when the lever 5 completes the transport of the film by the full length of a frame because the aforementioned tracking member then penetrates into the oncoming perforation of film and enables the pawl 13 to disengage the pawls 17 and 18 from the wheels 12 adnd 19. Thus, the spring 10 is then free to return the lever 5 to its starting angular position.

The wheel 19 is connected with a properly inserted takeup spool or reel R by way of a gear train which forms part of the film transporting mechanism and includes a one-way clutch (not specifically shown) and a friction clutch (not specifically shown) as well as gears 20, 21, 22 and 23. The gear 23 carries motion transmitting pins 23a which extend into an axially movable coupling element 24 cooperating with conventional vanes at the upper end of the reel R to rotate the latter when the lever 5 is being pivoted in a counterclockwise direction, as viewed in FIG. 2. The coupling element 24 is biased against the adjacent end face of the reel R by a helical spring 24a. The aforementioend one-way clutch of the film transporting mechansim insures that the coupling element 24 rotates the takeup reel R only when the lever 5 pivots in a counterclockwise direction. The parts 20–24 are at a standstill when the lever 5 pivots clockwise under the action of the return spring 10.

When the lever 5 dwells in the illustrated starting angular position, the opening or slot 12a of the wheel 12 registers with a motion receiving shutter actuating member 25, i.e., the member 25 is located in the path of movement of the finger 11b on the second motion transmitting member 11. When the membrane 6 is deformed to move the first motion transmitting member 7 downwradly, the projections 7a displace the second motion transmitting member 11 and the finger 11b then actuates the motion receiving member 25 which releases the shutter so that the camera makes an exposure. However, when the lever 5 is moved out of the illustrated starting angular position, the finger 11b of the motion transmitting member 11 is out of register with the motion receiving member 25; the finger 11b is then located at a level above the inclined face of a cam or abutment 26. Thus, an exposure can be made only when the lever 5 dwells in its starting angular position; in all other angular positions of the lever 5, the finger 11b is out of register with and cannot actuate the motion receiving member 25. If the membrane 6 is deformed while the lever 5 dwells in a position other than the illustrated starting angular position, the finger 11b moves into abutment with the inclined face of the abutment or cam 26. This cam is positioned in such a way that the tip of the finger 11b does not extend beyond the slot 12a when the membrane 6 is deformed. However, such deformation of the membrane 6 results in a tilting of the motion transmitting member 11 against the opposition of the leaf spring 9. The member 11 then pivots at 11c under the action of the arm 9a of the leaf spring 9.

An important advantage of such mounting of the membrane 6 that its center is located on the axis of the shaft 3 is that the membrane occupies room which is readily available in the rapid transport lever 5. The projections 7a of the motion transmitting member 7 insure proper transmission of motion to the member 11 in response to deformation of the membrane 6 despite the fact that the parts 6, 7 and 11 of the release mechanism are concentric with each other and coaxial with the shaft 3. Savings in space are of particular importance in relatively small and inexpensive still cameras.

The just described camera is susceptible of many modifications without departing from the spirit of the invention. For example, a simplified version of the camera will be furnished without the lobe 12b, without the pawl 17 and/or without the slot 19a and pawl 18. Also, the member 11 and/or 25 of the release mechanism can be replaced with an electric switch which is normally open and can be closed in response to deformation of the diaphragm 6 (preferably only in the starting angular position of the lever 5) to thereby complete the circuit of an electrically or electronically operated shutter.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic apparatus, particularly in a still camera, a combination comprising a housing; film transporting means including an input element supported by said housing for angular movement about a predetermined axis; and release means including a deformable membrane secured to and sharing the angular movement of said input element, said membrane being accessible for deformation from without said housing whereby the deformation of said membrane initiates the making of an exposure said release means further including a plurality of motion transmitting members movably mounted in said housing and comprising a first motion transmitting member arranged to change its position in response to deformation of said membrane and a second motion transmitting member arranged to change its position in response to said change of position of said first motion transmitting member.

2. A combination as defined in claim 1, wherein said input element is a lever which is pivotable about said axis in two directions and is arranged to effect the forward transport of film in response to angular movement in one of said directions.

3. A combination as defined in claim 2, wherein said membrane has a substantially circular outline and a central portion located on said axis.

4. A combination as defined in claim 2, wherein said lever has an exposed outer side which is provided with a recess and said membrane is mounted in said recess.

5. A combination as defined in claim 4, further comprising a frame received in said recess and surrounding said membrane, said membrane having an exposed outer side and said frame extending outwardly beyond at least one of said outer sides.

6. A combination as defined in claim 1, wherein said first motion transmitting member is inwardly adjacent to said membrane position with, and said second motion transmitting member is inwardly adjacent to said first motion transmitting member, one of said members having a plurality of projections extending toward the other of said members to change the position of said second member with reference to said housing in response to deformation of said membrane and the resulting change in the position of said first member.

7. A combination as defined in claim 6, further comprising drive means for rotating said second member with said input element, said release means further comprising a motion receiving member which is movably mounted in said housing and is movable by said second member in response to deformation of said membrane in a single angular position of said input element.

8. A combination as defined in claim 7, wherein said second motion transmitting member has a central portion having its center located on said axis and a projection which can reach said motion receiving member in response to movement of said second member with reference to said housing in said single angular posiion of said input element.

9. A combination as defined in claim 8, further comprising abutment means provided in said housing and located in the path of movement of said projection when said second member is caused to move with reference to said housing in response to deformation of said membrane while said input element dwells in an angular position other than said single position.

10. A combination as defined in claim 6, wherein said second motion transmitting member is a plate-like body which is tiltable with reference to said housing, and further comprising resilient means mounted in said housing to store energy in response to tilting of said second member.

11. A combination as defined in claim 10, wherein said resilient means comprises at least one leaf spring.

12. A combination as defined in claim 6, further comprising drive means for rotating said second motion transmitting member in response to angular movement of said input element in at least one of two directions, said drive means comprising a wheel which receives torque from said input element and transmits torque to said second member, said release means further comprising a motion receiving member which is movable by said second member in response to deformation of said membrane in a single angular position of said input element and said second member.

13. A combination as defined in claim 12, wherein said wheel has an opening and said second motion transmitting member comprises a projection which extends into said opening and is movable beyond said opening to engage and move said motion receiving member in said single angular position of said second member.

14. A combination as defined in claim 13, further comprising blocking means actuatable to hold said wheel against further rotation in response to a predetermined angular displacement of said input element from said single position and in said one direction.

15. A combination as defined in claim 14, wherein said blocking means is actuatable by the film in said housing.

16. A combination as defined in cliam 12, wherein said film transporting means further comprises at least one gear and one-way clutch means for rotating said gear in response to angular movement of said wheel in said one direciton.

17. A combination as defined in claim 16, further comprising biasing means for urging said input element and said wheel to said single angular position and means for holding said wheel against rotation in the other of said directions during angular movement of said input element from said single position in said one direction and to a second angular position which said input element reaches upon completed lengthwise transport of the film through a predetermined distance.

* * * * *